United States Patent [19]
Chang et al.

[11] Patent Number: 5,840,803
[45] Date of Patent: Nov. 24, 1998

[54] THERMOPLASTIC COMPOSITION CONTAINING A GRAFTED COPOLYMERIC ACRYLATE RUBBER

[75] Inventors: Moh Ching Oliver Chang; Richard M. Auclair, both of Westfield, Mass.

[73] Assignee: Bayer Corporation, Pittsburgh, Pa.

[21] Appl. No.: 806,965

[22] Filed: Feb. 26, 1997

[51] Int. Cl.⁶ .................................................... C08L 51/04
[52] U.S. Cl. .............................. 525/85; 525/70; 525/80; 525/238; 525/302; 525/307
[58] Field of Search .................................. 525/85, 80, 70, 525/302, 307, 238

[56] References Cited

U.S. PATENT DOCUMENTS

| | | | |
|---|---|---|---|
| 3,944,631 | 3/1976 | Yu et al. | |
| 4,224,419 | 9/1980 | Swobada et al. | 525/71 |
| 4,442,263 | 4/1984 | Brandstetter et al. | 525/83 |
| 4,753,988 | 6/1988 | Henton et al. | 525/73 |
| 4,880,875 | 11/1989 | Wassmuth et al. | 525/67 |
| 5,120,788 | 6/1992 | Seitz et al. | 525/85 |
| 5,252,666 | 10/1993 | Seitz et al. | 525/80 |

FOREIGN PATENT DOCUMENTS

| | | |
|---|---|---|
| 735063 | 10/1996 | European Pat. Off. . |
| 3134103 | 3/1983 | Germany . |

*Primary Examiner*—Fred Zitomer
*Attorney, Agent, or Firm*—Joseph C. Gil; Aron Preis

[57] ABSTRACT

A thermoplastic molding composition which contains (i) a grafted copolymer rubber having a grafted phase of styrene-acrylonitrile phase and a crosslinked (meth)acrylate-acrylonitrile substrate, and (ii) an ungrafted, uncrosslinked SAN having a number average molecular weight of about 20,000 to 100,000 is disclosed. The composition which is further characterized in that it contains no additional grafted copolymer rubber based on crosslinked (meth)acrylate-acrylonitrile substrate and in that the grafted copolymer rubber is present in particulate form where the particles have a monomodal size distribution and a weight average particle size of 0.05 to 0.5 microns exhibits improved mechanical properties.

11 Claims, No Drawings

THERMOPLASTIC COMPOSITION CONTAINING A GRAFTED COPOLYMERIC ACRYLATE RUBBER

The present invention is directed to a resinous composition capable of being processed thermoplastically based on acrylate-styrene-acrylonitrile (ASA) and more particularly to a composition suitable for injection molding.

A thermoplastic molding composition which contains (i) a grafted copolymer rubber having a grafted phase of styrene-acrylonitrile phase and a crosslinked (meth)acrylate-acrylonitrile substrate, and (ii) an ungrafted, uncrosslinked SAN having a number average molecular weight of about 20,000 to 100,000 is disclosed. The composition which is further characterized in that it contains no additional grafted copolymer rubber based on crosslinked (meth)acrylate-acrylonitrile substrate and in that the grafted copolymer rubber is present in particulate form where the particles have a monomodal size distribution and a weight average particle size of 0.05 to 0.5 microns exhibits improved mechanical properties.

The so called weatherable ASA polymers have long been know in the art - see for instance U.S. Pat. No. 3,944,631 and the documents cited therein. These polymers contain a grafted crosslinked acrylate rubber phase said to offer improved properties.

Also relevant is U.S. Pat. No. 4,224,419 which disclosed a composition containing a first graft copolymer, a second graft copolymer and as a third, hard component, a copolymer of styrene and acrylonitrile. Both first and second grafts include as a substrates crosslinked acrylic ester polymers, the difference being in terms of their respective particle size: the first rubber has a mean particle diameter (weight average) 50–150 nm and the second is 200–500 nm. U.S. Pat No. 4,753,988 disclosed a high gloss composition containing a matrix of SAN and a grafted crosslinked alkyl acrylate rubber. The elastomer phase comprise (i) rubber of particle size 0.5 to 0.8 microns and 5 to 40% grafted phase and (ii) crosslinked rubber of 0.05 to 0.2 microns and 15 to 60 grafted phase. Inclusion of optional comonomers, such as acrylonitrile, in the acrylate rubber is disclosed. Similarly relevant is U.S. Pat. No. 4,880,875 which disclosed optional comonomers such as acrylonitrile (AN) in a butylacrylate (BA) substrate.

Rubber grafts which contain comonomers have been disclosed in U.S. Pat. Nos. 5,120,788 and 5,252,666. The criticality of particle size in relevant compositions has been disclosed in U.S. Pat. No. 4,442,263 discloses relevant composition where the crosslinked acrylate has a particular mean particle size. In a copending patent application PCT/US9506172 there is disclosed a composition comprising a first and a second grafted acrylate rubber substrates differing one from the other in terms of their respective particle sizes, and a matrix with which each of the substrates is grafted. The compositional makeup of the rubber substrate includes acrylate and an unsaturated nitrile monomer.

The present invention is directed to a thermoplastic molding composition which contains (i) a monomodal grafted copolymer rubber comprising a grafted styrene-acrylonitrile (SAN) phase (optionally crosslinked) and a crosslinked (meth)acrylate-acrylonitrile (BA-AN) substrate, and (ii) an uncrosslinked, ungrafted SAN. The composition may optionally include as an additional component, uncrosslinked copolymer of α-methyl styrene and acrylonitrile. In comparison to corresponding compositions wherein rubber substrate contains no acrylonitrile, the composition of the present invention exhibits improved mechanical properties. Further, it was surprisingly found that bimodality of rubber particles of the substrate is not necessary for attaining the improved impact strength of the composition.

The thermoplastic molding composition of the invention contains about 5 to 45, preferably 10–40 percent, relative to its weight, of rubber. Notably, in the embodiments of the invention, relating to extrusion compositions, the preferred amount of rubber is in the range of 15 to 40 percent relative to the weight of the composition. The molding composition comprise:

(i) about 5 to 95 percent by weight of a monomodal grafted copolymer rubber comprising a grafted phase of styrene-acrylonitrile (SAN) phase (optionally crosslinked) and a crosslinked (meth)acrylate-acrylonitrile (BA-AN) substrate, and (ii) about 5 to 95 percent by weight of an uncrosslinked, ungrafted SAN having a number average molecular weight of about 20,000 to 100,000, preferably 25,000 to 55,000 g/mole.

The composition is characterized in that (a) it contains no additional grafted copolymer rubber based on crosslinked (meth)acrylate- acrylonitrile substrate, and (b) the particles of (i) have a monomodal size distribution and a weight average particle size of (i) is 0.05 to 0.5 microns.

The composition may optionally contain a positive amount, up to about 80, preferably up to 50, percent relative to the total weight of (i) and (ii) of an uncrosslinked copolymer of α-methyl styrene and acrylonitrile having a number average molecular weight of about 20,000 to 100,000, preferably 25,000 to 50,000 g/mole.

In a preferred embodiment, the composition contains 20 to 80 percent of component (i) and 80 to 20 percent of component (ii).

In the context of the present invention the grafted copolymer rubber contains a substrate and a phase grafted thereto (herein grafted phase).

The substrate is a crosslinked copolymer of (meth)acrylate and acrylonitrile. Advantageously, the copolymer contains about 99.9 to 85% by weight of (meth)acrylate and 0.1 to 15% acrylonitrile (AN), preferably the copolymer contains 98 to 88% (meth)acrylate and 2 to 12% AN, most preferably the copolymer contains 96 to 92% (meth)acrylate and 4 to 8% AN, the percent being relative to the weight of the substrate.

The (meth)acrylate component used in the substrate of the invention is derived from at least one member selected from the group consisting of $C_1$–$C_{18}$-alkyl acrylate and $C_1$–$C_6$-alkyl methacrylate, preferably, $C_2$–$C_8$-alkyl acrylate and $C_1$–$C_4$-alkyl methacrylate monomers.

Crosslinking as a characteristic of the copolymers in the present context refers to their substantial insolubility in such solvents as tetrahydrofuran, methyl ethyl ketone or cyclohexanone. The degree of crosslinking imparted to the inventive substrate is that which results from incorporating in the substrate about 0.1 to 2.0 parts of crosslinking agent per hundred parts by weight of substrate (pphr); preferably the crosslinking agent is present in an amount of 0.4 to 1.4 pphr. Crosslinking of the copolymer substrate is attained during the polymerization of the (rubber) substrate by including in the reaction as a crosslinking agent, a di- or poly-functional ethylenically unsaturated monomer having at least one vinyl group.

Among the suitable crosslinking agents mention may be made of divinyl benzene, trimethylol propane triacrylate, allyl methacrylate, diallyl fumerate, diallyl maleate, 1,3-butylene dimethacrylate, diethylene glycol dimethacrylate, ethylene glycol dimethacrylate, trimethylol propane trimethacrylate, methylene bisacrylamide, diethylene glycol diacrylate, ethylene glycol diacrylate, divinyl ether, diallyl phthalate, divinyl sulfone, divinyl sorbitol, triethylene glycol dimethacrylate, trimethylene glycol diacrylate, butylene glycol diacrylate, octylene glycol diacrylate, trimethylolpropane triacrylate, tetraacrylate ester of pentaerythritol, ethylidene norbornene, vinyl norbornene and diallyl phosphonate. The preferred crosslinking agent is diallyl maleate (DAM).

The optionally crosslinked, grafted phase of styrene-acrylonitrile (SAN) is characterized in that it contains about 20 to 40 percent of acrylonitrile (AN) and 80 to 60 percent of styrene, the preferred relative amounts are 25 to 35 percent of acrylonitrile and 65 to 75 percent of styrene, the percents being in relations to the weight of the grafted SAN phase. Optionally, the grafted phase may include minor amounts, less than 20 percent by weight relative to the weight of this phase, of at least one member selected from the group of additional monomers such as substituted chlorobenzene, styrene (t-butyl styrene, α-methyl styrene), ethylenically unsaturated compounds (methyl methacrylate, alkyl acrylate, vinylidene chloride maleic anhydride, N-substituted maleimide) ethylene, propylene and isobutylene.

The grafted phase may optionally be crosslinked. Crosslinking is attained by means similar to the ones discussed above in respect to the substrate. The amount of crosslinking agent incorporated in the grafted phase is about 0.05 to 0.5, preferably 0.1 to 0.3 pphr of grafted phase.

The preferred composition of the grafted phase is SAN copolymer which contains 28 percent of AN and 72 percent of styrene. Crosslinking may be attained by the introduction of DAM.

The ratio between the amounts of grafted phase to substrate in the component (i) is in the range of about 25 to 150 pbw of grafted phase per 100 pbw of substrate.

The grafted copolymer rubber has a weight average particle size of 0.05 to 0.5 microns, preferably 0.1 to 0.3 microns.

The grafted copolymer rubber of the present invention are prepared by any of the methods which are well known to those skilled in the art. Preferably, these are prepared by polymerizing the styrene and acrylonitrile monomers in the presence of the rubber, by emulsion, suspension bulk or mass polymerization methods. At least a portion of the monomers are combined chemically or grafted onto the rubber substrate and a portion form ungrafted matrix.

In the grafting procedure, the preferred vinyl aromatic monomers are styrene, α-methyl styrene and the like. The preferred unsaturated nitrile monomers are AN and methacrylonitrile.

A portion of the vinyl aromatic and unsaturated nitrile monomers polymerized in the presence of the rubber substrate used to prepare the grafted copolymer rubber of the present invention will not be grafted to the rubber substrate but will be present as ungrafted polymer, such as polystyrene-acrylonitrile (SAN). The amount of ungrafted SAN polymer depends upon the weight ratio of monomers to rubber, the nature of the rubber and the conditions of polymerization. In the present invention the source of component (ii) is the ungrafted portion discussed above with or without SAN which is prepared separately and added to the composition.

The uncrosslinked, ungrafted (free) SAN, component (ii) of the inventive composition is a copolymer of styrene-acrylonitrile characterized in that it contains about 20 to 40 percent of acrylonitrile and 80 to 60 percent of styrene; the preferred relative amounts are 25 to 35 percent of acrylonitrile and 65 to 75 percent of styrene, the percents being in relations to the weight of the uncrosslinked free SAN phase. Optionally, this phase may include minor amounts, less than 20 percent by weight relative to the weight of this phase, of additional monomers such as substituted styrene (t-butyl styrene, chlorobenzene, a-methyl styrene) or ethylenically unsaturated compounds such as methyl methacrylate, alkyl acrylate, vinylidene chloride, ethylene, propylene, isobutylene, maleic anhydride, N-substituted maleimide or mixtures of any of the above. The preferred composition of the uncrosslinked, ungrafted component (ii) contains 28 percent of AN and 72 percent of styrene.

The optional component, uncrosslinked copolymer of α-methyl styrene and acrylonitrile, included in the inventive composition is a copolymer of α-methyl styrene-acrylonitrile characterized in that it contains about 20 to 40 percent of acrylonitrile and 80 to 60 percent of α-methyl styrene; the preferred relative amounts are 25 to 35 percent of acrylonitrile and 65 to 75 percent of α-methyl styrene, the percents being in relations to the weight of the uncrosslinked copolymer of the α-methyl styrene and acrylonitrile. Optionally, this phase may include minor amounts, less than 20 percent by weight relative to the weight of this phase, of additional monomers such as substituted styrene (t-butyl styrene, chlorobenzene) or ethylenically unsaturated compounds such as methyl methacrylate, alkyl acrylate, vinylidene chloride, ethylene, propylene, isobutylene, maleic anhydride, N-substituted maleimide or mixtures of any of the above. The preferred composition of the uncrosslinked, copolymer contains 32 percent of AN and 68 percent of α-methyl styrene.

The components entailed in the inventive composition are conventional and the preparation of each has been described in the art, see for instance U.S. Pat. No. 3,944,631 and the documents cited therein. Additives, such as light, including UV, and thermal stabilizers as well as antioxidants, fillers, pigments and dyes may be included in the inventive composition for their art-recognized utility.

The processing of the inventive compositions is carried out in conventional equipment and follows conventional means.

Experimental

Compositions in accordance with the invention have been prepared and their properties determined as summarized below. The composition contained (i) A crosslinked butylacrylate-acrylonitrile substrate, grafted with SAN. The crosslinking agent was 0.6 pphr diallyl maleate in the rubber and 0.15 pphr diallyl maleate in the grafted SAN phase. The relative amount of acrylonitrile in the rubber is indicated in the tabulated examples. The weight ratio between the grafted SAN phase and the rubber substrate was 35/100.

(ii) The uncrosslinked SAN copolymer contained about 28% acrylonitrile, the balance being styrene; its molecular weight (number average was about 48,000 g/mole).

The examples contained the optional component (iii) uncrosslinked copolymer of α-methyl styrene (68% by weight) and acrylonitrile (32% by weight) having a number average molecular weight of 30,000.

The relative amounts of components (i), (ii) and (iii) were such that the total (i) and (ii) amounted to 43.6% by weight and component (iii) amounted to 56.40 % relative to the weight of the composition.

The melt temperature upon compounding was 490° F and the molding pressure (minimum) was 653 psi.

The table below summarizes the results. In addition it would be noted that the Young's modulus of the compositions and the Vicat temperatures were independent of the amount of AN in (i) and were, respectively, 2.2 GPa and 112° C.

TABLE

| Example | 1 | 2 | 3 | 4 | 5 |
|---|---|---|---|---|---|
| % AN in substrate | 0 | 3 | 6 | 9 | 12 |
| 60° Gloss | 95 | 95 | 95 | 96 | 95 |
| Izod Impact strength, J/m 12.7 mm thickness | | | | | |
| at 75° C. | 128 | 239 | 314 | 301 | 407 |
| at 50° C. | 72 | 163 | 201 | 149 | 179 |
| at 23° C. | 52 | 75 | 91 | 78 | 71 |
| at 0° C. | 42 | 61 | 63 | 46 | 44 |
| at −30° C. | 24 | 28 | 29 | 24 | 23 |
| Impact strength[1], Joule | 19 | 21 | 21 | 21 | 21 |
| Impact strength[2], Joule | 23 | 31 | 31 | 34 | 34 |
| Tensile yield stress, MPa | 43 | 42 | 41 | 42 | 41 |
| Tensile yield strain, % | 3.2 | 3.1 | 3.2 | 3.2 | 3.3 |
| Tensile elongation @ break % | 13 | 22 | 22 | 37 | 34 |

[1]Energy @ peak, multiaxial impact strength, at 23° C.
[2]Energy @ fail, multiaxial impact strength, at 23° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising
   (i) about 5 to 95 percent by weight of a grafted copolymer rubber comprising a grafted phase of styrene-acrylonitrile (SAN) phase and a crosslinked (meth)acrylate-acrylonitrile (BA-AN) substrate, and
   (ii) about 5 to 95 percent by weight of an uncrosslinked SAN having a number average molecular weight of about 20,000 to 100,000,
said composition further characterized in that (a) it contains no additional grafted copolymer rubber based on crosslinked (meth)acrylate-acrylonitrile substrate and in that said (i) is in particulate form wherein particles have a monomodal size distribution and a weight average particle size of 0.05 to 0.5 microns.

2. The thermoplastic molding of claim 1 further containing a positive amount of up to about 80 percent relative to the total weight of (i) and (ii) of an uncrosslinked copolymer of α-methyl styrene and acrylonitrile having a number average molecular weight of about 20,000 to 100,000 g/mole.

3. The thermoplastic molding composition of claim 2 wherein said substrate is present in said composition in an amount of about 10 to 40 percent relative to the total weight of said composition.

4. The thermoplastic molding composition of claim 2 wherein said substrate is present in said composition in an amount of about 20 to 30 percent by weight.

5. The thermoplastic molding composition of claim 1 wherein said substrate comprises about 99.9 to 85% relative to its weight of (meth)acrylate and 0.1 to 15% acrylonitrile.

6. The thermoplastic molding composition of claim 1 wherein said substrate comprises about 98 to 88% relative to its weight of (meth)acrylate and 2 to 12% acrylonitrile.

7. The thermoplastic molding composition of claim 1 wherein said substrate comprise about 96 to 92% relative to its weight of (meth)acrylate and 4 to 8% acrylonitrile.

8. The thermoplastic molding composition of claim 1 wherein said (meth)acrylate is at least one member selected from the group consisting of $C_1$–$C_{18}$-alkyl acrylate and $C_1$–$C_6$-alkyl methacrylate monomers.

9. The thermoplastic molding composition of claim 1 wherein said (meth)acrylate is at least one member selected from the group consisting of $C_2$–$C_8$-alkyl acrylate and $C_1$–$C_4$-alkyl methacrylate monomers.

10. The thermoplastic molding composition of claim 1 wherein said grafted phase relates by weight to said substrate as 25/100 to 100/100.

11. The thermoplastic molding composition of claim 1 wherein said number average molecular weight is about 25,000 to 55,000 g/mole.

* * * * *